United States Patent
Cheung et al.

(10) Patent No.: US 10,447,027 B1
(45) Date of Patent: Oct. 15, 2019

(54) METHOD AND APPARATUS FOR REVERSE OVER CURRENT PROTECTION

(71) Applicant: Intersil Americas LLC, Milpitas, CA (US)

(72) Inventors: Chun Cheung, Bridgewater, NJ (US); Mir Mahin, Jamison, PA (US); Paul Dackow, Flemington, NJ (US)

(73) Assignee: Intersil Americas LLC, Milpitas, CA (US)

( * ) Notice: Subject to any disclaimer, the term of this patent is extended or adjusted under 35 U.S.C. 154(b) by 0 days.

(21) Appl. No.: 15/828,348

(22) Filed: Nov. 30, 2017

Related U.S. Application Data

(60) Provisional application No. 62/438,849, filed on Dec. 23, 2016.

(51) Int. Cl.
| | | |
|---|---|---|
| *H02M 3/157* | (2006.01) | |
| *H02H 7/12* | (2006.01) | |
| *G05F 1/10* | (2006.01) | |
| *H02M 3/156* | (2006.01) | |

(52) U.S. Cl.
CPC .............. *H02H 7/1213* (2013.01); *G05F 1/10* (2013.01); *H02M 3/156* (2013.01)

(58) Field of Classification Search
CPC ........ H02M 3/10; H02M 3/135; H02M 3/145; H02M 3/155; H02M 3/156; H02M 3/157; H02M 3/158; G05F 1/52; G05F 1/56; G05F 1/569; G05F 1/571; G05F 1/575; G05F 1/573; G05F 1/5735; G05F 1/10
USPC ........ 323/265, 276, 282, 283, 284, 285, 351
See application file for complete search history.

(56) References Cited

U.S. PATENT DOCUMENTS

| | | | | |
|---|---|---|---|---|
| 3,736,469 | A * | 5/1973 | Baugher | H02H 7/1213 323/285 |
| 4,073,004 | A * | 2/1978 | Chambers | G09G 1/005 361/90 |
| 8,018,694 | B1 * | 9/2011 | Wu | H02M 1/32 361/18 |
| 8,085,017 | B2 | 12/2011 | Qiu et al. | |
| 9,244,473 | B2 * | 1/2016 | Young | G05F 1/12 |
| 2005/0111149 | A1 * | 5/2005 | Motomori | H02H 7/1213 361/18 |
| 2008/0043391 | A1 * | 2/2008 | Wong | H03F 1/52 361/59 |
| 2008/0079405 | A1 * | 4/2008 | Shimizu | H02M 1/4208 323/282 |
| 2013/0207625 | A1 * | 8/2013 | Futamura | G05F 1/10 323/271 |
| 2015/0109077 | A1 * | 4/2015 | Tomimbang | H01H 83/20 335/7 |
| 2015/0365003 | A1 * | 12/2015 | Sadwick | H02M 3/28 363/21.01 |

(Continued)

*Primary Examiner* — Adolf D Berhane
(74) *Attorney, Agent, or Firm* — Foley & Lardner LLP

(57) ABSTRACT

The present embodiments relate to methods and apparatuses for providing fault protection in a power controller such as a voltage regulator, and particularly protection against reverse over current fault conditions. Some embodiments are capable of distinguishing between different types of reverse over current conditions, such as a high-side short or a normal over voltage condition. In these and other embodiments, fault protection is performed in favor of a load connected to the voltage regulator, rather than components of the voltage regulator itself.

12 Claims, 5 Drawing Sheets

(56) References Cited

U.S. PATENT DOCUMENTS

2016/0373009 A1\* 12/2016 Tateishi ................ H02M 3/156
2017/0187278 A1\* 6/2017 Yamaguchi ........... H02M 1/088

\* cited by examiner

METHOD AND APPARATUS FOR REVERSE OVER CURRENT PROTECTION

CROSS-REFERENCE TO RELATED APPLICATIONS

The present application claims priority to U.S. Provisional Application No. 62/438,849 filed Dec. 23, 2016, the contents of which are incorporated herein by reference in their entirety.

TECHNICAL FIELD

The present embodiments relate to power control, and more particularly to methods and apparatuses for providing reverse over current protection in power controllers such as a voltage regulator.

BACKGROUND

Conventional power controllers such as DC-DC converters or voltage regulators include switching circuitry that is controlled to provide a regulated output voltage to a load. Many such conventional power controllers include protection mechanisms in the event of faults such as reverse over current, which can be caused by a short circuit in the switching circuitry, for example. However, some conventional fault protection mechanisms risk damaging the load, which is not desired and incurs cost.

SUMMARY OF THE INVENTION

The present embodiments relate to methods and apparatuses for providing fault protection in a power controller such as a voltage regulator, and more particularly for providing protection against reverse over current fault conditions. Some embodiments are capable of distinguishing between different types of reverse over current conditions, such as a high-side short or a normal over voltage condition. In these and other embodiments, fault protection is performed in favor of a load connected to the voltage regulator, rather than components of the voltage regulator itself.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to certain general aspects, the present embodiments relate to methods and apparatuses for providing fault protection in a power controller such as a voltage regulator, and particularly protection against reverse over current fault conditions. According to some aspects, embodiments distinguish between different types of reverse over current conditions, such as a high-side short or a normal over voltage condition. According to certain other aspects, fault protection is performed in favor of protecting a load connected to the voltage regulator, rather than protecting components of the voltage regulator itself.

Figure 1:
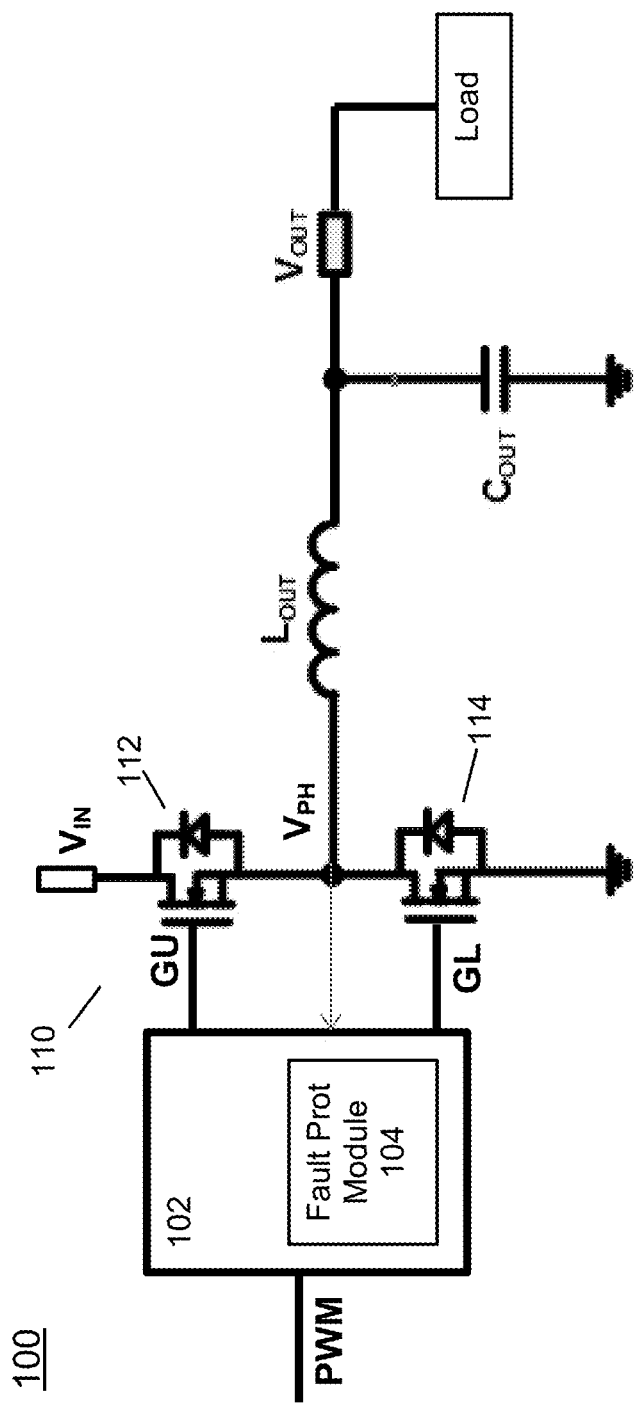
FIG. 1 is a schematic block diagram of a typical voltage regulator circuit including a fault protection module.

To assist in illustrating the above and other aspects, FIG. 1 is a schematic block diagram of a conventional voltage regulator 100 topology for converting an input voltage $V_{IN}$ to a regulated output voltage $V_{OUT}$. The illustrated topology is referred to as a "buck" DC-DC converter, where the input voltage $V_{IN}$ is converted to a lower output voltage $V_{OUT}$. In this example topology, a switching circuit 110 comprising a high-side FET 112 and low-side FET 114 is connected between the input voltage $V_{IN}$ and a reference voltage, typically ground or Vss. The switching circuit 110 is driven by a driver module 102 in response to a pulse-width modulated signal PWM, typically from a PWM controller (not shown).

In typical operation, in response to a pulse on the PWM signal, and for the duration of the pulse, driver module 102 turns on high-side FET 112 (e.g. by driving signal GU coupled to the gate of high-side FET 112 to a sufficient voltage level) and turns off low-side FET 114 (e.g. by driving signal GL coupled to the gate of low-side FET 112 to ground). This causes a current from the input voltage source to flow through output inductor $L_{OUT}$ and charge output capacitor $C_{OUT}$ to a desired voltage level for $V_{OUT}$. As shown in FIG. 1, the output voltage can be provided to a Load, which can be a component in a computer such as a microprocessor, for example. When there is no pulse on the PWM signal, driver module 102 turns off high-side FET 112 and turns on low-side FET 114.

It should be noted that the topology 100 illustrated in FIG. 1 can be included in a single-phase voltage regulator, or it can be included in one phase of a multi-phase voltage regulator. It should be further noted that although the example topology 100 is illustrated in "buck" topology example, the principles of the embodiments can be extended to other types of topologies such as a "boost" topology and a "buck-boost" topology.

In addition to driving the switching circuit 110, driver module 102 can also include module 104 for providing certain fault protections for the voltage regulator 100, such as power-on reset (POR) fault protection, over-current protection (OCP), switching circuit on-time protection (OTP), protections against switching circuit component shorts, etc. In general, it is desirable for conventional driver modules 102 having such fault protection modules 104 to protect the Load first and then itself, or both the Load and itself in equal priority, when something breaks.

Figure 2:
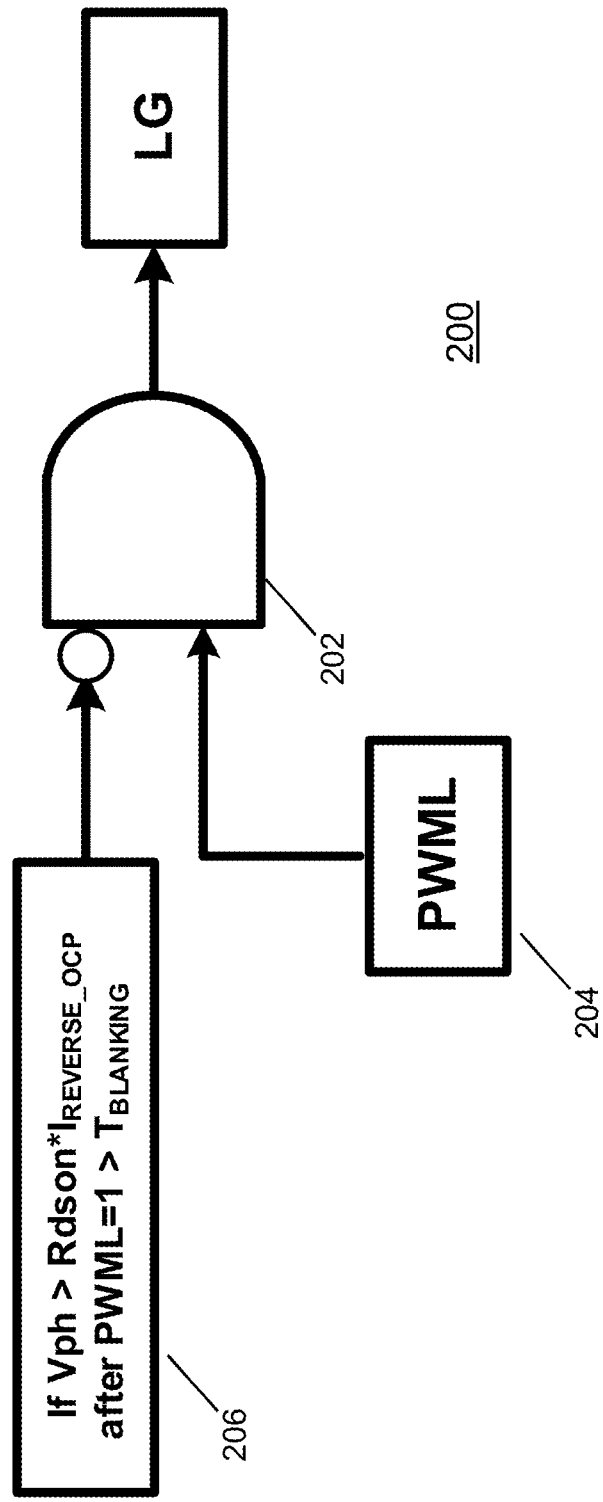
FIG. 2 is a block diagram illustrating conventional reverse over current protection.

FIG. 2 is a block diagram illustrating a conventional reverse over current protection (ROCP) circuit 200 that can be included in a fault protection module 104 such as that illustrated above. As shown, AND gate 202 receives two signals 204, 206. A first signal 204 PWML can be the inverse of the PWM signal from the PWM controller, and typically is a logic "high" except when a pulse is present on the signal. A second signal 206 represents the detected occurrence of a reverse over current fault and is a logic "low" except when the fault is detected. As shown in this example, signal 206 is inverted before being input to AND gate 202.

The output of AND gate 202 is coupled to the gate 208 of low-side FET 114 (e.g. it is the signal GL shown in FIG. 1). Accordingly, in this example configuration, except when the module 104 determines the occurrence of a reverse over current fault condition, circuit 200 causes switching circuit 110 to operate normally in response to the condition of the PWM signal as described above. More particularly, when there is no reverse over current fault, the signal 206 is in the logic "low" state and is inverted before being input to AND gate 202, which allows the output of AND gate 202 to be a logic "high" whenever the signal 204 is a logic "high," thus turning on the low-side FET 114 except when there is a pulse on the PWM signal. However, when the fault condition is detected, the signal 206 goes to a logic "high," which after being inverted before input to AND gate 202, forces the output of AND gate 202 to be a logic "low" regardless of the state of PWML signal 204, which therefore forces the low-side FET 114 to be turned off during the fault condition.

The reverse over current fault condition can be detected in various ways. For example, in the conventional topology shown in FIG. 1, the voltage $V_{PH}$ at the node between the high-side FET 112 and low-side FET 114 can be monitored by module 104. When this voltage $V_{PH}$ exceeds a voltage likely associated with a reverse over current fault, the condition is detected. More particularly, with reference to FIG. 1, if high-side FET 112 short circuits while low-side FET 114 is turned on, a large amount of current will be drawn from $V_{IN}$ toward the ground or reference terminal connected to low-side FET 114. This causes the voltage $V_{PH}$ at the node between high-side FET 112 and low-side FET 114 to increase to a level that is the product of the current and the Rdson resistance of the low-side FET 114 (the Rdson resistance value can be a parameter that is pre-configured in module 104). Accordingly, when the current through low-side FET 114 exceeds an amount associated with a fault condition (e.g., a current exceeding the value $I_{REVERSE\_OCP}$, which can be a pre-configured parameter), the voltage $V_{PH}$ will exceed the product Rdson*$I_{REVERSE\_OCP}$. In the example shown in FIG. 2, after this excessive current condition is determined (i.e. $V_{PH}$>Rdson*$I_{REVERSE\_OCP}$), there can be a slight delay (e.g. at least a period $T_{BLANKING}$ after PWML is a logic "high" or 1) after the $V_{PH}$ voltage level is exceeded before signal 206 is driven to a logic "high," thereby forcing the low-side FET 114 to turn off after a short delay.

The present applicants recognize some problems with conventional reverse over current protection approaches such as the one illustrated above in connection with FIG. 2. First, if the reverse over current is caused by a short circuit in the high-side FET 112 (i.e. HS Short), forcing the low-side FET 114 to be turned off as described above causes all the energy from the voltage source providing $V_{IN}$ to be dumped onto the Load, so the Load is not protected as is generally desired. Second, if the reverse current is caused by other conditions such as a normal over-voltage condition (i.e. Normal OVP) or PWM stuck low condition, immediately forcing the low-side FET 114 to be turned off can unnecessarily damage the low-side FET 114.

Figure 3B:
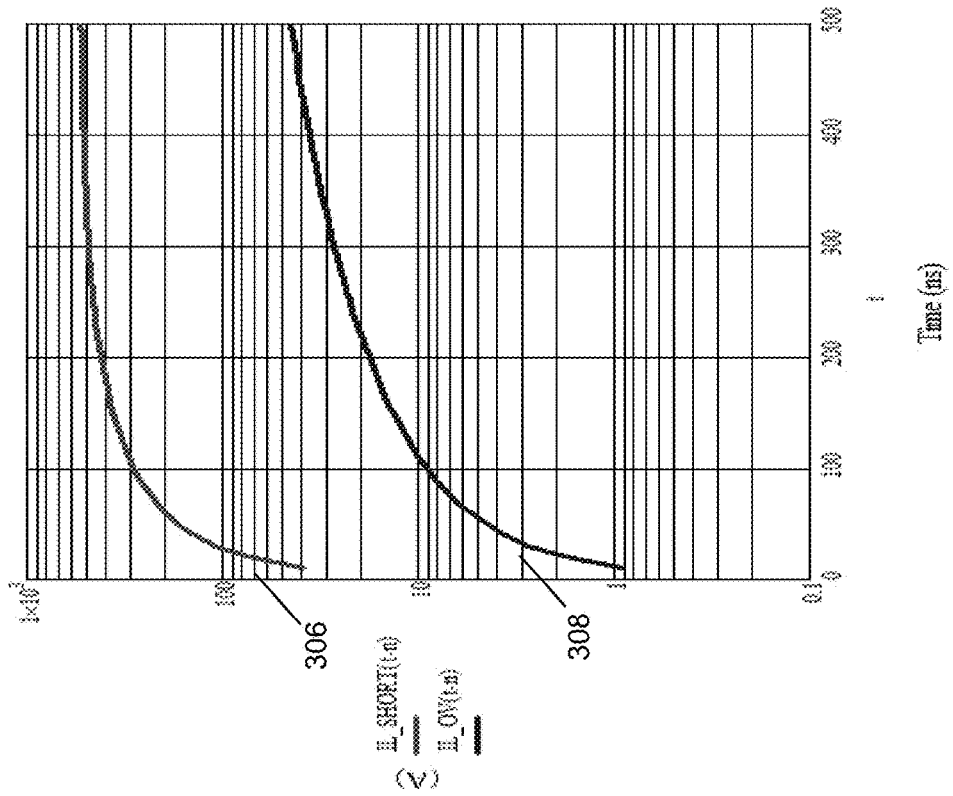
FIGS. 3A and 3B illustrate aspects of comparing a reverse over current fault due to a HS Short condition versus a Normal OVP condition or PWM stuck low or other reasons.
Figure 3A:
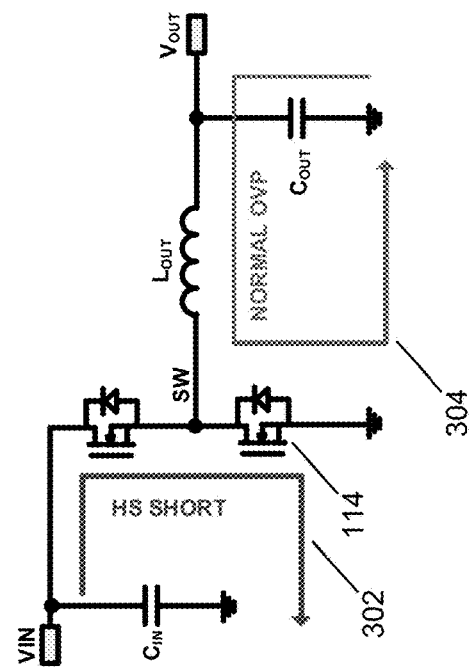

FIGS. 3A and 3B illustrate aspects of the differences between HS Short conditions and Normal OVP conditions that have been recognized by the present applicants. As shown in FIG. 3A, and as described above, an HS Short condition causes a reverse over current flow 302 through low-side FET 114 originating from the voltage source $V_{IN}$. In a Normal OVP condition, the current flow 304 through low-side FET 114 originates from the output side of the voltage regulator and also flows through output inductor $L_{OUT}$.

As shown in FIG. 3B, a HS Short condition with very low inductance on the current loop 302 leads to a fast current buildup through low-side FET 114, for example exceeding 100 A within 400 ns as shown by curve 306. By contrast, a Normal OVP condition with a substantially larger output inductance $L_{OUT}$ on the current loop 304 leads to a slow current buildup through low-side FET 114, for example less than 50 A within 400 ns as shown by curve 308 in FIG. 3B.

According to certain aspects, therefore, the present applicants recognize that it would be beneficial to distinguish between different fault conditions that can result in excessive reverse over current in a power controller such as a voltage regulator, and respond differently to these different fault conditions.

Figure 4:
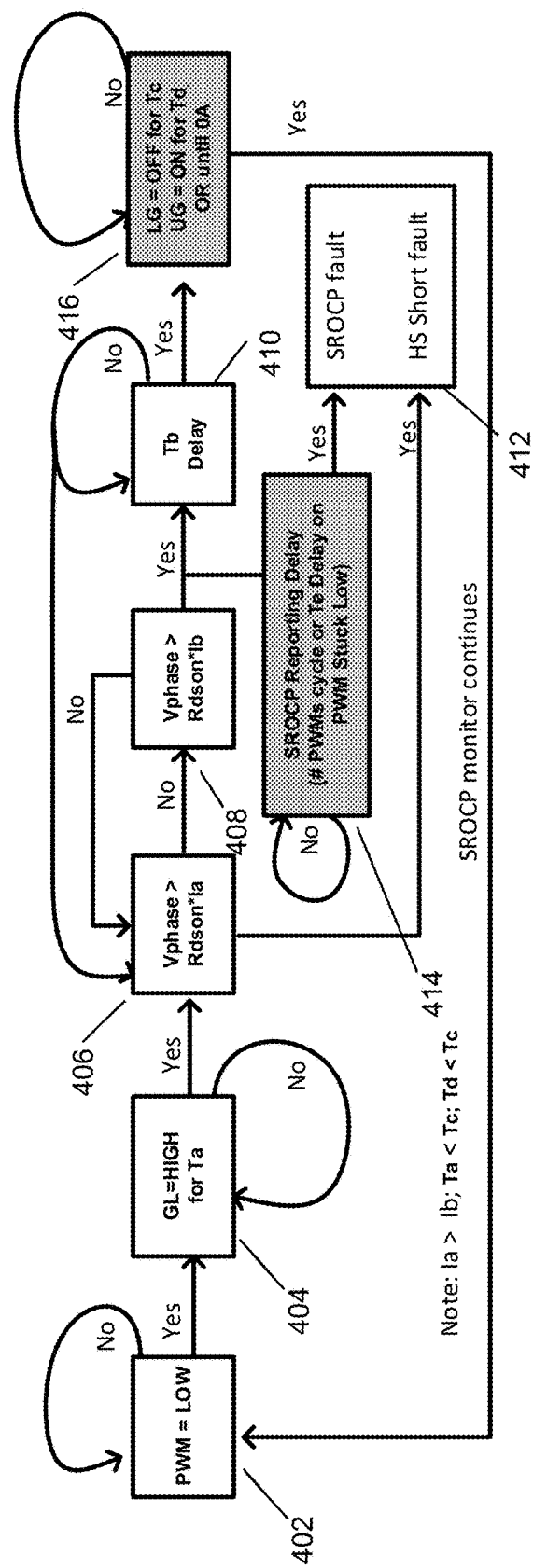
FIG. 4 is an example state diagram illustrating aspects of smart reverse over current protection (SROCP) according to embodiments.

FIG. 4 is an example state diagram illustrating aspects of smart reverse over current protection (SROCP) according to embodiments. Circuitry or firmware implementing this state diagram can be included in a power controller such as a voltage regulator, such as fault protection module 104 shown in FIG. 1.

As shown, in block 402, processing starts when there is no pulse on the PWM signal, in other words when PWM is a logic "low".

When block 402 detects that PWM is low, the state advances to block 404, where the module waits until the signal GL that turns on low-side FET 114, for example in response to the PWM being low, has been on for a period indicated as Ta.

After block 404 determines that the signal GL has been on for the period Ta, block 406 monitors the $V_{PH}$ voltage and compares it to a high voltage level that would be consistent with a HS Short condition. In this example, the value is Rdson*Ia, and a reference voltage value can be pre-configured or otherwise used by block 404 for performing the comparison with voltage $V_{PH}$. If block 406 detects that $V_{PH}$ exceeds this high voltage level Rdson*Ia, the state advances to block 412, where a HS Short fault condition is declared.

As will be described in more detail below, when this fault condition is declared, and differently from conventional approaches, the low-side FET 114 is not turned off, but is kept on to protect the Load.

If block 406 determines that the voltage $V_{PH}$ is presently not consistent with a HS Short condition, the state advances to block 408, where processing is performed to determine whether a normal reverse current condition exists due to Normal OVP or PWM stuck low or for other reasons. For example, as shown, the voltage $V_{PH}$ is compared with a high voltage threshold of Rdson*Ib, which is lower than the threshold for detecting a HS Short condition, and a lower reference voltage value can be pre-configured or otherwise used by block 406 for performing this comparison with voltage $V_{PH}$. If $V_{PH}$ exceeds this threshold voltage, a non HS short reverse current condition is declared. As will be described in more detail below, in addition to a fault being declared in block 412 (perhaps after optional additional processing in block 414), the low-side FET 114 is turned off in response to this condition being declared.

If block 408 detects a non HS short reverse current condition, the state advances to block 410. As shown, block 410 waits for a delay indicated as Tb before advancing to block 416. During Tb delay, a HS short condition continues to be monitored in block 406, and if a HS short condition occurs during the waiting period, it will issue a HS short fault immediately and abandon advancing to block 416 Otherwise, if no HS Short condition or non HS reverse current condition (e.g., due to Normal OVP fault or PWM stuck low) is detected, processing eventually returns to block 402 to wait for the end of the next PWM pulse.

In the example shown in FIG. 4, after a delay indicated as Tb after block 408 detects a non HS short reverse current condition, the state advances to block 416. In this example, for a non HS short reverse current condition, the low-side FET 114 is turned off for a period indicated as Tc via the LG signal and the high-side FET 112 is turned on for a period indicated as Td via the UG signal or until the high-side FET 112 current drops to OA. Thereafter, state returns to block 402 to wait for the end of the next PWM pulse. According to certain aspects, the delays in turning off the low-side FET 114 as provided in these example embodiments can help prevent damage to the low-side FET 114 that would otherwise occur in conventional approaches due to nuisance reverse current trip, for example. According to certain additional aspects, turning on the high-side FET 112 as provided in these example embodiments can reduce stress on the body diode of high-side FET 112 when the low-side FET 114 is forced off with a large reverse current.

Additionally or alternatively to the example duration described above, block 408 can be modified to instead turn on the high-side FET 112 for a duration related to $Ib/[(V_{IN}-V_{OUT})/L_{OUT}]$ or to detect a current drop below 5 A before turning off the high-side FET 112.

As set forth above, after either fault condition is detected, the state advances to block 412. If block 412 is entered because of a HS Short fault condition, the low-side FET 114 is allowed to remain on. Given the amount of current typically involved, this will likely cause the low-side FET 114 to fail and the voltage regulator (or a single phase thereof) to become inoperable. However, according to aspects of the embodiments, the load to which the voltage regulator is connected will be protected. Moreover, in multi-phase embodiments, handshaking with other phases can be included to provide failover and other protections.

If block 412 is entered because of a non HS short reverse current condition, block 412 may simply cause this condition to be signaled to other circuitry, perhaps with other operating parameter information. In additional or alternative embodiments shown in FIG. 4, after a non HS short reverse current event, state also advances to block 414, where additional or optional processing is performed so as to provide a "Smart" reverse over current fault declaration by block 412.

In these and other embodiments, block 414 can include determining whether a reverse over current associated with a non HS short reverse current condition occurs for a number of consecutive PWM pulses (or Te delay of PWM stuck low). In this example, a "Smart" reverse over current fault is declared by block 412 only when block 414 makes this determination. Additionally or alternatively, block 414 can include determining that a reverse over current condition exists in conjunction with the PWM signal remaining low for a threshold amount of time. In this example, a "Smart" reverse over current fault is declared by block 412 to signal a PWM stuck low condition.

It should be noted that the threshold values (e.g. the voltage reference Rdson*Ib to detect reverse over current conditions), delay durations and other time durations provided in the above examples are non-limiting, and are given for purposes of illustration of the present embodiments in one example voltage regulator only. Those skilled in the art that many variations of these and other parameters can be made, depending on various factors such as the size of the FETs, the input and output voltages, the number of phases, etc.

Figure 5:
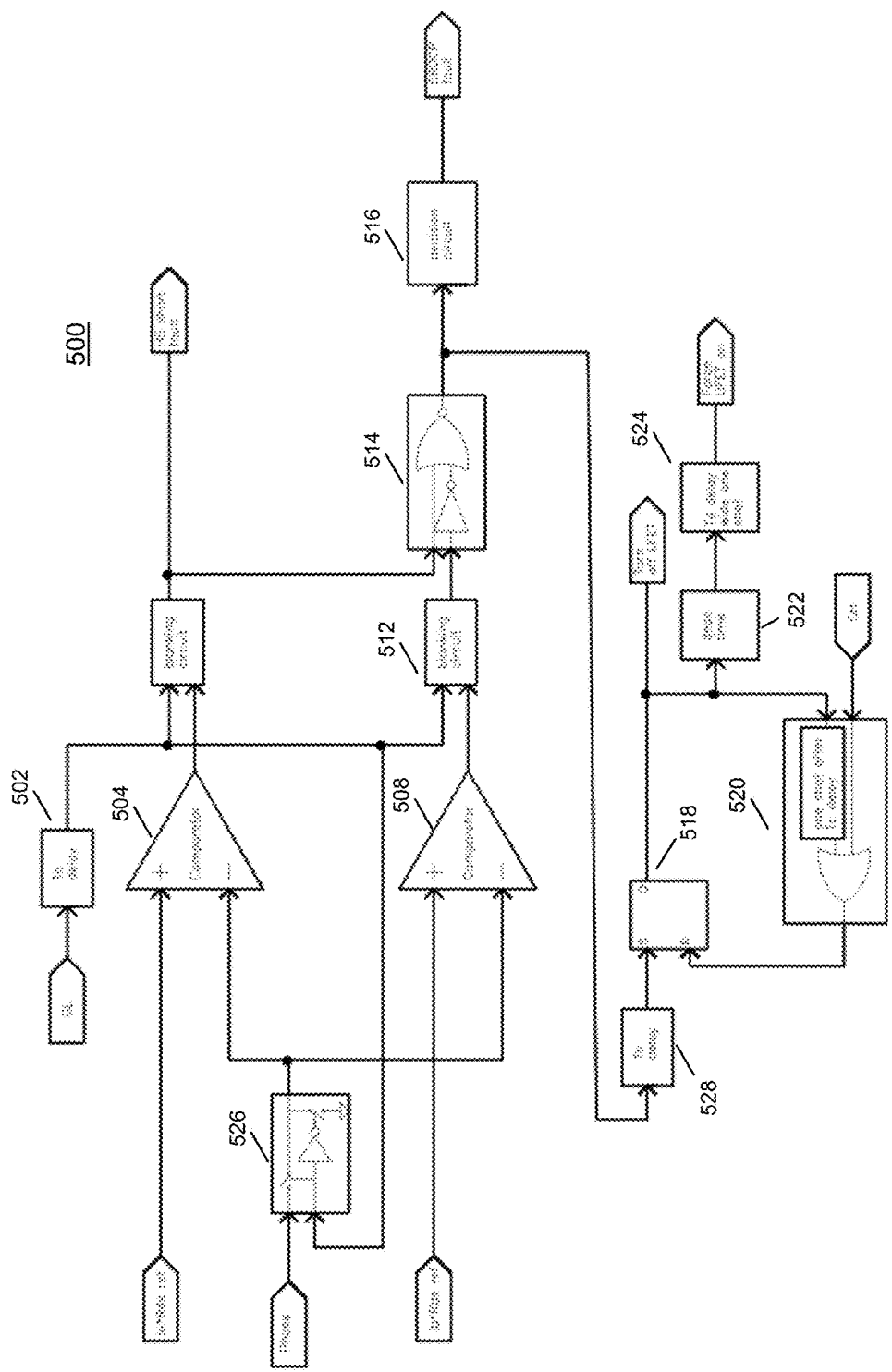
FIG. 5 is a block diagram illustrating an example circuit implementation of SROCP according to embodiments.

FIG. 5 is a block diagram illustrating an example implementation of reverse over current protection circuitry 500 according to embodiments.

As shown in this example, circuitry 500 includes a Ta delay 502 coupled to a signal LCQ corresponding to a signal such as GL, which can be used to implement block 404, for example. Accordingly, when signal LCQ is a logic "high" for a period Ta, delay 502 outputs a logic "high".

A comparator 504 and a switch 526 can implement block 406 in this example. Switch 526 causes a Phase signal corresponding to the voltage level of $V_{PH}$ to be passed after the delay 502 output goes "high". The voltage $V_{PH}$ is compared to a Ia reference voltage (either pre-configured or fixed by other circuitry, for example) by comparator 504, which outputs a logic "high" if the voltage $V_{PH}$ is higher than the reference. This indication is eventually output on the HS Short fault signal shown in FIG. 5.

A comparator 508, a blanking circuit 512 and logic block 514 can implement block 408 in this example. The voltage $V_{PH}$ is passed to comparator 508. Comparator 508 compares the voltage $V_{PH}$ to a reference voltage corresponding to Ib (either pre-configured or fixed by other circuitry, for example) and outputs a logic "high" if the voltage $V_{PH}$ is higher than the reference. Based on a logic combination with the output of comparator 504 by logic block 514, and optional further processing, it can be used to output a Normal OVP fault via the SROCP fault signal shown in FIG. 5.

Delay 528 can implement the Tb delay in block 410 and decision circuit 516 can implement the additional "Smart" reverse over current detection processing described above in connection with block 414 in this example.

Shift register 518, delay block 520, dead time block 522 and Tb wide one shot 524 can implement the processing of block 416 in this example. In this example, when a Normal OVP fault has been detected, the signal LG for the low-side FET 114 is set to a turn-off level for a period of Tb, and the signal UG for the high-side FET 112 is set to a turn-on level for 200 ns.

It should be appreciated that the present embodiments provide various benefits such as a more robust power stage solution, lower field returns and less re-work during prototyping. Embodiments may be incorporated in various smart power stage products, for example.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method for providing fault protection in a voltage regulator coupled to a load, comprising:
    monitoring a current from the voltage regulator to the load; and
    distinguishing between conditions of a short in the voltage regulator and a non-short over current condition based on the monitored current,
    wherein the voltage regulator operates based on a pulse width modulated (PWM) signal, and wherein the non-short over current condition is associated with the PWM signal being stuck low.

2. The method of claim 1, wherein the voltage regulator includes a high-side FET coupled to an input voltage and a low-side FET coupled to a reference voltage, and wherein the short is associated with a short circuit of the high-side FET.

3. The method of claim 1, further comprising, if the condition is the short, providing fault detection in favor of the load over the voltage regulator.

4. The method of claim 2, further comprising, if the condition is the short, providing fault detection in favor of the load over the voltage regulator by allowing the low-side FET to remain turned on.

5. The method of claim 1, further comprising, if the condition is the non-short over current condition, providing fault detection in favor of the voltage regulator over the load.

6. The method of claim 2, further comprising, if the condition is the non-short over current condition, providing fault detection in favor of the voltage regulator over the load by turning off the low-side FET for a period.

7. The method of claim 6, wherein the low-side FET is turned off after a delay from when the non-short over current condition is detected.

8. An apparatus for providing fault protection in a voltage regulator coupled to a load, comprising:
    a fault protection module configured to:
        monitor a current from the voltage regulator to the load; and
        distinguish between conditions of a short in the voltage regulator and a non-short over current condition based on the monitored current,
    wherein the voltage regulator includes a high-side FET coupled to an input voltage and a low-side FET coupled to a reference voltage, and wherein the short is associated with a short circuit of the high-side FET, and
    wherein if the condition is the non-short over current condition, the fault protection module is configured to provide fault detection in favor of the voltage regulator over the load by turning off the low-side FET for a period.

9. The apparatus of claim 8, wherein the non-short over current condition is associated with a normal over-voltage condition.

10. The apparatus of claim 8, wherein the voltage regulator operates based on a pulse width modulated (PWM) signal, and wherein the non-short over current condition is associated with the PWM signal being stuck low.

11. The apparatus of claim 8, wherein if the condition is the non-short over current condition, the fault protection module is configured to provide fault detection in favor of the voltage regulator over the load.

12. The apparatus of claim 8, wherein the low-side FET is turned off after a delay from when the fault protection module detects the non-short over current condition.

* * * * *